United States Patent [19]

McCullough

[11] Patent Number: 5,539,658
[45] Date of Patent: Jul. 23, 1996

[54] ELECTRONIC PRESENTATION SYSTEM USING PORTABLE STORAGE MEDIA

[75] Inventor: Timothy L. McCullough, Mahtomedi, Minn.

[73] Assignee: Minnesota Mining and Manufacturing Company, St. Paul, Minn.

[21] Appl. No.: 442,012

[22] Filed: May 16, 1995

[51] Int. Cl.$^6$ ............................................. H04N 7/15
[52] U.S. Cl. ........................................ 364/514 A; 348/12
[58] Field of Search ........................ 364/514 C, 514 A; 359/148; 348/12, 13; 395/600

[56] References Cited

U.S. PATENT DOCUMENTS

| | | |
|---|---|---|
| 4,939,509 | 7/1990 | Bartholomew et al. . |
| 5,191,410 | 3/1993 | McCalley et al. .................. 348/13 |
| 5,204,768 | 4/1993 | Tsakihs et al. ..................... 359/148 |
| 5,208,665 | 5/1993 | McCalley et al. .................. 348/12 |

OTHER PUBLICATIONS

Harvard® Spotlight 2.0 brochure for Windows® and Windows '95®, Software Publishing Corporation, Santa Clara, CA, 2 pages, No Date.
EZShow Systems Inc. advertisement entitled "It was not possible with PowerPoint® Just add EZTools and you can do it!!!" (1 page).
"The Wavelet Packet Transform," M. Cody, *Dr. Dobb's Journal*, Apr. 1994, pp. 44–54, 100.
"AT&T VoiceSpan™: A Powerful, Personal Technology For Simultaneous Voice–and–Data Communication," VoiceSpan Technology, White Paper, presented by AT&T Paradyne Multimedia Products, Sep. 1994, pp. 1–7.
"If we can teach an ordinary phone line how to walk and chew gum at the same time, you can teach it to dance," AT&T VocieSpan™ Advertisement.
"'VoiceView' exchanges voice and data in a single phone call," P.C. Letter, Info World Publishing Inc., Feb. 28, 1994, v10, n4 p. 1(1).
"The Fast Wavelet Transform," M. Cody, *Dr. Dobb's Journal*, Apr. 1992, pp. 16–18, 23–24, 26, 28, 100–101.
Future Labs, Inc., Brochure on TALKShow® software product.
"DataPort™ 2001," AT&T VoiceSpan Advertisement, 1993, No. DIL–FO20–2–1293.
"The DSP breakthrough is music to our ears," N. Nicholaisen, *Computer Shopper*, Oct. 1993, v13, n10, p. 570(4).
Catalogue/Brochure of multimedia software products, 2 pages.

*Primary Examiner*—Emanuel T. Voeltz
*Assistant Examiner*—Thomas Peeso
*Attorney, Agent, or Firm*—Gary L. Griswold; Walter N. Kirn; Eric D. Levinson

[57] ABSTRACT

A method of facilitating electronic presentations using portable storage media. An array of images to be displayed to an audience is converted into a database and stored on the presenter's computer hard drive. A copy of the image database is transferred to a portable storage medium, such as a personal computer (PC) card, which is then inserted into a display device such as a liquid crystal display (LCD) panel equipped to accept a PC card. When the presenter selects which image is to be displayed to the audience, the selection is communicated to the LCD panel which displays the corresponding image in the database copy on the PC card for viewing by the audience. The present invention also includes a system for giving electronic presentations.

10 Claims, 1 Drawing Sheet

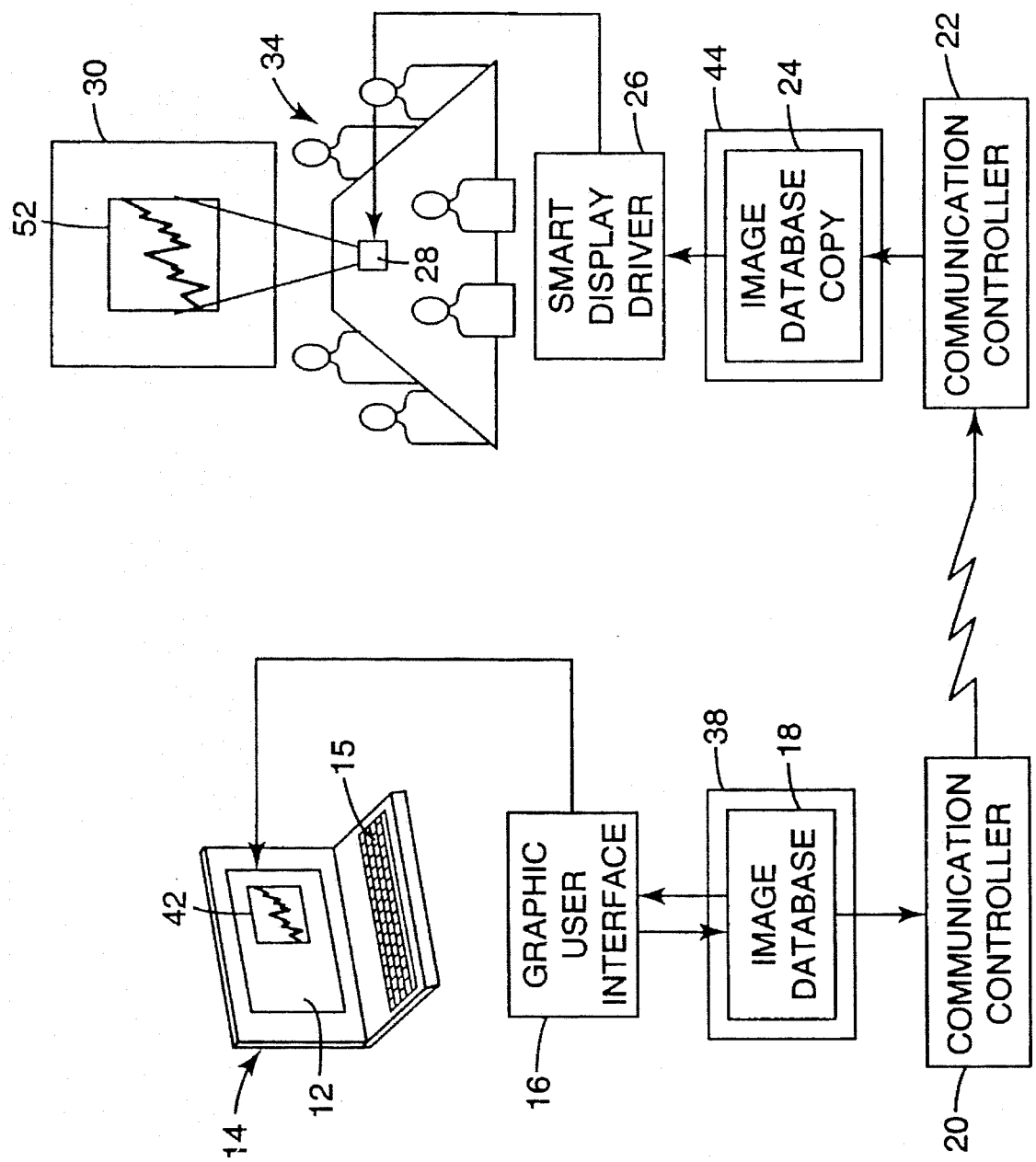

ELECTRONIC PRESENTATION SYSTEM USING PORTABLE STORAGE MEDIA

FIELD OF THE INVENTION

The present invention relates generally to the electronic presentation of viewable images to an audience.

BACKGROUND OF THE INVENTION

Overhead projector/film-based presentation has been in existence since the early 1960s. The paradigm established at that time is still with us today. Specifically, an outline is prepared and "visuals," e.g., 8½ by 11 inch (22×28 cm) transparent films, are produced to help a presenter communicate a message to an audience. The visuals are typically organized in sequence together with a few notes and are often accompanied by "backup visuals" to help the presenter address unanticipated questions and audience concerns. While the technology used for making visuals has changed considerably over the years, this basic, common sense, user-friendly, "talk and show" paradigm has remained relatively constant. Indeed, the changes in printing and copying technology have dramatically changed the ways that visuals are produced.

At first, visual content was created via a typewriter and converted into visuals by a thermal transfer process (e.g., infrared transparency makers). Later, manufacturers invented machines which slowly typed out bold letters onto adhesive strips which were applied to transparent film to make the visual. Later, word processing took over for the typewriter, followed by the first-generation computers which replaced dedicated word processors. Spreadsheets, graphing, and charting capability came shortly thereafter, but the real impact came with the advent of laser printing and subsequent color printing devices which utilized ink jet and thermal mass transfer technology. These innovations, along with the greatly simplified process of making high-quality color visuals, have fueled the growth of the computer-generated transparency film market.

Software companies responded by improving the "content authoring" capabilities of word processing, charting, drawing and clip art products. This was the early start of presentation graphic software programs, such as Harvard Graphics™ and Aldus Persuasion™. The primary objective of these software application programs was to generate high-impact charts and graphs on transparency film, paper, color laser 8×10 inch (20×25 cm) film, or laser-generated 35 mm slides.

When computer-generated visuals and presentation graphics programs became commonplace, and liquid crystal display (LCD) projection panels were developed, it did not take long for the market to realize that an expensive step of presentation preparation could be eliminated by projecting images directly from the computer, thus eliminating the need for hard copy output. This begot the early electronic presentation market. (An LCD projection panel is a device that connects to a computer and/or video source and sits atop a transmissive overhead projector and, as such, is a direct replacement/substitute for transparency film.)

Typically, the LCD panel is connected to the computer through the general purpose interface known in the industry as VGA (Video Graphics Array). Whereas VGA is a widely-accepted standard, it also has many constraints relative to the specific application of electronic presentation:

1. Power consumption. VGA is designed to drive an external display unit at a nominal resolution of 480 lines by 640 pixels, where each pixel is four bits of color, or one of 16 colors. Data transfer rates can easily exceed 20 Mbits/second. This transfer rate draws substantial power from a battery-operated computer, thereby reducing the life of the battery. Thus, from practical perspective, the unit is usually plugged into an electrical outlet when a presentation is being given. This leads to a more cumbersome setup and requires the speaker to be in close proximity to both the LCD panel and an alternating current (AC) outlet.

2. Limited product migration. VGA is essentially a fixed format (640 lines×480 pixels) standard. It is not compatible with new higher speed, higher resolution standards and requires adapters to interface with a television (TV) monitor.

3. Difficult setup. The VGA cable, designed for use with desktop computers, is physically large for mobile computing and can be somewhat cumbersome to hook-up. This extends the setup time, lowers the "comfort level" of the speaker, and makes it difficult to support multiple speakers in rapid succession, as is common in many business presentations. Furthermore, it eliminates the use of a whole class of mobile computers that do not come equipped with VGA ports (i.e., all Personal Digital Assistants (PDAs) and many sub-notebook computers).

4. Limited presentation control. VGA is most often used to duplicate the computer's image onto another screen. This means that, unless additional hardware is added, the audience views the same image being shown on the presenter's computer. In this "single view" mode, the presenter is deprived of the comfortable presentation paradigm of a "stack of visuals together with speaker notes."

In order to address this last issue, some companies have developed software and accompanying hardware that converts the presenter's computer into an "electronic lectern" complete with a slide sorter, speaker notes, and a method to control what the audience sees. One company, EZ Show (Burnaby, B. C. Canada) has created software sold under the name "EZ Presenter" and an associated external graphics display card, which together provide the "electronic lectern" functionality. Another company, Software Publishing Company (SPC) of Santa Clara, Calif., U.S.A., offers a software package sold under the name "Spotlight," which also allows the presenter to have the functionality of a "presenter's lectern." The SPC System requires either a second computer or an additional internal video graphics board to be installed in the presenter's computer in order to drive the audience's display device. Most notebook computers do not have the physical room for the addition of an internal graphics display board. Whereas both of these systems offer the convenience of a presenter's lectern, they require additional hardware and are themselves based on, and thus limited by, the VGA standard.

SUMMARY OF THE INVENTION

The present invention includes a method for facilitating electronic presentations. The method includes the following steps. A database containing the images to be displayed to an audience is stored on a first storage medium, such as a notebook computer's hard drive. The images in the database are assigned a unique address so that they can be retrieved from the database by reference to the unique address. This database and addressing information is then copied and the copy is stored on a second, portable storage medium, such as a diskette or storage medium in PC (personal computer) card format. (PC card format refers to an international standard for miniaturized peripherals; it defines the physical dimension, roughly 86 mm×54 mm by 5 mm, and the electronic protocol which allows PC card peripherals to interface appropriately equipped portable computer. The PC card standard was set down by the PCMCIA, Personal Computer Memory Card International Association. Most mobile computers manufactured since 1994 are set up to accept PC cards.) This portable storage medium is then inserted into a display device, such as an LCD panel equipped to accept the portable storage medium, referred to herein as a "smart" LCD panel.

The presenter selects various images in the image database on the first storage medium for presentation to the audience. This selection of images is then communicated to the display device, e.g., via wireless modem. The corresponding images is retrieved from the portable storage medium in the smart LCD panel and are then displayed to the audience.

The present invention also includes a system for giving electronic presentations. The system includes a computer, such as a notebook computer, and a monitor (or screen) associated therewith. The system also includes first and second storage media having first and second image databases, respectively, stored thereon as described above. A graphic user interface is provided for locating and displaying images in the first database on the presenter's monitor. An input means, such as a keyboard or electronic mouse, allows the presenter to select various images in the first database for display on the presenter's monitor. A first communication device, such as a modem, sends signals relating to the selection of the various images in the first database to a second communication device, which may also be a modem, which receives the signals. The second communication device communicates the instructions (or commands) on to a display device which displays the selected images from the second database onto a screen for viewing by an audience.

BRIEF DESCRIPTION OF THE DRAWING

The FIGURE is a schematic diagram of an electronic presentation system according to one embodiment of the present invention.

DETAILED DESCRIPTION

The present invention will now be described with reference to the FIGURE. A presenter (not shown) desires to make a visual presentation to an audience 34. Initially, the presenter must decide upon the content of the presentation, i.e., which images will be displayed to audience 34. Once these images are assembled, they are converted to a parametric, resolution-independent format, thereby creating a platform-independent image database 18. Each image in database 18 is assigned a specific address within the database.

Database 18 is saved on storage medium 38, which may be any conventional storage medium, such as a hard drive or a portable storage medium such as a PC card, a magnetic floppy diskette, a rewritable optical disc, etc. A copy 24 of database 18 is stored on a portable storage medium 44, such as the media described above.

Before the beginning of the presentation, portable storage medium 44 containing image database copy 24 is inserted into display device 28. When the presenter is ready to give the presentation, storage medium 38 containing image base 18 is accessed by the presenter's computer 14 via graphic user interface 16. Meanwhile, storage medium 44 containing image database copy 24 is accessed by display device 28 via smart display driver 26 for presentation to audience 34.

The presentation is given as follows. When the presenter desires to display a given image to audience 34, the presenter, using graphic user interface 16, selects the desired image from database 18. This image appears on monitor 12 as image 42. The address of the desired image is derived by graphic user interface 16 from input action by the presenter such as pointing at one image in an array of images (not shown) on monitor 12. This can be done by the use of keyboard 15, an electronic mouse, or by other inputting means, such as by making the screen of monitor 12 touch-sensitive.

Once the image to be presented is accessed by computer 14 for presentation, the address of that image, for example, SLD1, is passed from image base 18 to communication controller 20. Communication controller 20 transmits the command "Display the image found at address SLDI" to communication controller 22, which passes on the command to image database copy 24. The image in database copy 24 having the address SLD1 is then accessed by smart driver 26 and is projected by display device 28 onto viewing screen 30 for viewing by audience 34.

Monitor 12 preferably provides the presenter with an "electronic lectern" which displays information helpful to the presenter, such as image 42 representing image 52 being displayed to audience 34, a sequential listing of available images in image base 18, and written notes which will aid the presenter during the presentation. When the presenter is ready to switch to the next image, the request is made by using graphic user interface 16 as described above, e.g., by using the electronic mouse to click on the desired image, or by clicking or touching a bar labeled "Next Image" on monitor 12, or by using keyboard 15. The command is then passed from graphic user interface 16 to communication controller 20, which transmits the command to communication controller 22, and the corresponding image in image database copy 24 is displayed to audience 34 as image 52 on screen 30.

Computer 14 is preferably a portable computer such as is manufactured by International Business Machines (IBM), Boca Raton, Fla., U.S.A., and is equipped to accept a wireless modem in PC card format. Communication controllers 20 and 22 may be connected to each other via a simple hard-wired serial connection, but the preferred communications link is wireless. Wireless modems such as are available from Xircom in Calabasas, Calif., U.S.A., adhere to the PC card format and can be used to enable communication controller 20 to send digital commands to controller 22 without being physically connected. The process for displaying an image, which essentially defines the controlling system software, is as follows.

Graphic user interface 16 receives the address of the desired slide to be displayed by an input from the presenter as described above. In a similar manner, the presenter could define an area within a particular slide, often referred to a "a bullet item", to be shown. In either event, communication controller 20 receives a command from graphic user interface 16 in a digital format, an example of which is shown below.

A command is made up of two parts: an action and an operand, which are each preferably eight bits in length. Two sample commands are shown below.

| Action | Operand | Desired action at the remote location Action |
|---|---|---|
| Go to | Slide address | Display the slide specified by the address |
| Reveal | Bullet number on the current slide | Reveal the bullet item specified by the bullet number |

Communication controller 20 converts the command into a serial code stream such as: Null/Flag/Flag/Action/Operand/Flag/Flag/Null, where the hexadecimal specification is Null=00, Flag=7E, Go to=01, and Reveal=10. The address of a slide or bullet would be defined as a unique machine code plus any hexadecimal code except 7E.

This code stream is modulated by communication controller 20 and sent to communication controller 22 which demodulates the signal and reproduces the hexadecimal serial code stream. Communication controller 22 extracts the action and operand and passes them onto the smart display driver 26. Smart display driver 26 locates the specified image in image database copy 24 and executes the specified action which may, for example, result in displaying image 52 using display device 28 to audience 34. Display device 28 is preferably capable of displaying an image to a large audience, such as a desktop computer equipped with a monitor large enough for viewing by an audience, or preferably an integrated LCD projector equipped to accept portable storage medium 44, such as is available from Sharp, Inc., Japan.

There are several advantages to the system shown in the FIGURE. First, because a copy of the image content is stored on local storage medium 44, the speed with which various images can be displayed is greatly increased, since the transfer rate from image database copy 24 to display device 28 is typically much faster than most commercial communication device can transfer the image in image database 18 to display device 28. Similarly, the electrical power required to send a short command is much less than that required to transmit an entire image.

Second, because the images are stored on the local storage medium, a physical connection between computer 14 and display device 28, such as a VGA cable, is not required and thus virtually any portable computer equipped with a PC card slot can be used by the presenter as the presenter's lectern.

Third, the universal format, i.e., the platform-independent format (e.g., Portable Display Format (PDF)) makes the images stored in database copy 24 compatible with current and future display technology, such as VGA, SVGA, NTSC, HDTV, etc.

Fourth, separating the presenter's screen from the display screen allows the presenter to have an electronic lectern (as shown on monitor 12 in the FIGURE). This allows the presenter to organize the presentation much like the present film-based presentation paradigm (i.e., a visible stack of visuals, readily available speaker notes, etc.) and can be used to control the presentation in a likewise manner, e.g., one visual at a time or to reveal "bullet" items.

Fifth, the unique addressing information utilized by the present invention allows one presenter to jump between various visuals in the presentation without having to "page" through each visual serially. The addressing information also allows many presenters to store their presentations on a single storage medium 44.

If the order in which the presenters are making the presentation changes, there is no need to serially page through visuals prepared for a presenter whose presentation schedule has been changed. Instead, the new speaker simply selects the visual to be presented using computer 14, as described above, and proceeds with the desired presentation.

Sixth, because there are no cables linking computer 14 with display device 28, setup of the system is greatly simplified. This also reduces the risk that the presenter or a member of the audience will trip over cables in the room during the presentation.

Seventh, the system is convenient because all that the presenter needs to carry when traveling to another location is the portable storage medium, so long as computer 14 and a display device 28 having a smart display driver 26 are already present at the presentation site.

What is claimed is:

1. A method of facilitating electronic presentations, including the steps of:

storing a first database of images on a first storage medium;

providing a unique address for each image in the first image database;

storing the unique addresses on the first storage medium;

making a second image database which is a copy of the first image database, the images in the second image database each having the same unique addresses as the images in the first database;

storing the second image database and the unique addresses on a second storage medium, wherein the second storage medium is portable;

providing a computer and a monitor associated therewith, the computer having access to the first storage medium;

inserting the second storage medium into a display device;

displaying on the monitor information helpful to a person giving an electronic presentation;

selecting an image in the first image database on the first storage medium for display to an audience;

identifying the unique address of the selected image;

communicating from the computer to the display device (1) the unique address of the image, and (2) a command to display the image; and retrieving the selected image at the unique address in the second image database on the second storage medium and displaying the selected image to the audience.

2. The method of claim 1, wherein the second storage medium is a personal computer card.

3. The method of claim 1, wherein the various images are displayed to the audience by a liquid crystal display device configured to accept the second storage medium.

4. The method of claim 1, wherein the step of communicating (1) and (2) is performed via wireless modem.

5. The method of claim 14, further including the steps of selecting additional images in the image database on the first storage medium and locating the additional images in the second image database on the second storage medium and displaying the additional images in turn to the audience.

6. The method of claim 1, further including the steps of selecting additional images in the image database on the first storage medium and locating the additional images in the second image database on the second storage medium and displaying the additional images in turn to the audience.

7. A system for giving electronic presentations, comprising:

a computer including a graphical user interface associated therewith;

a first storage medium including a first database of images stored thereon, the first database including a unique address for each image in the first database;

a second storage medium, which is portable, including a second image database, which is a copy of the first image database, stored thereon;

a monitor for displaying information, including at least one image from the first image database, to a person giving an electronic presentation;

an input means for instructing the computer to select an image from the first storage medium to be displayed onto a screen for viewing by an audience;

a first communication device associated with the computer for sending signals (1) indicating the unique address of the selected image in the first database and (2) commanding that the selected image be displayed;

a second communication device for receiving and interpreting signals from the first communication device; and a device associated with the second communication device for retrieving the selected image from the second database on the second storage medium and displaying it onto the screen for viewing by the audience.

8. The system of claim 7, wherein the display device is a liquid crystal display device configured to accept the second storage medium.

9. The system of claim 7, wherein the first and second communication devices communicate via wireless modem.

10. The system of claim 9, wherein the computer is a portable computer.

* * * * *